Sept. 27, 1960  J. T. PHILLIPS, JR., ET AL  2,953,888
ROTARY TYPE GREEN FORAGE HARVESTER
Filed Aug. 8, 1955  2 Sheets-Sheet 1
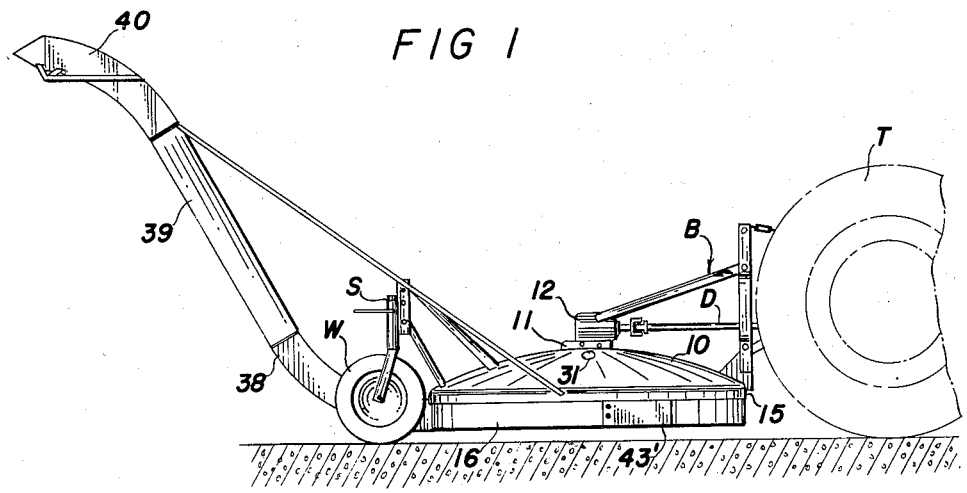
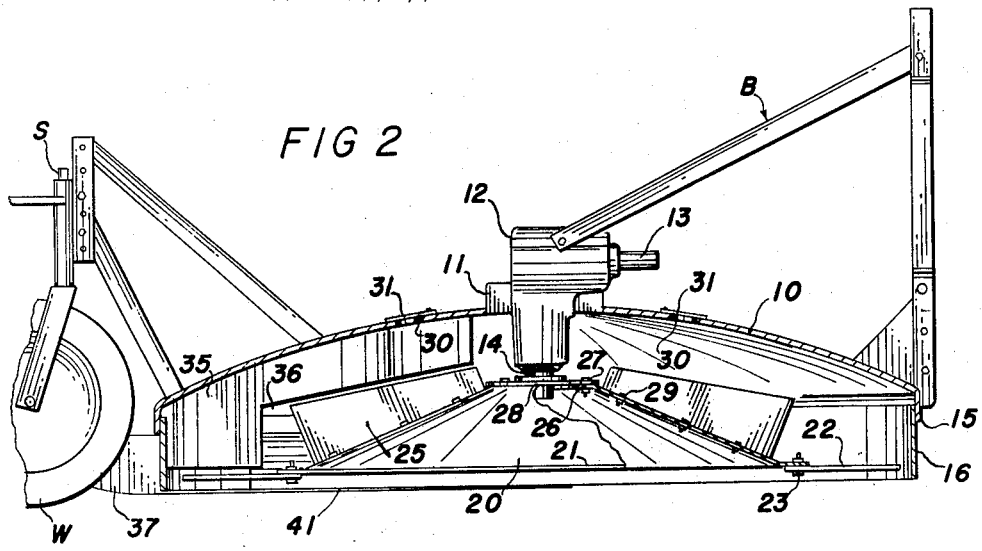
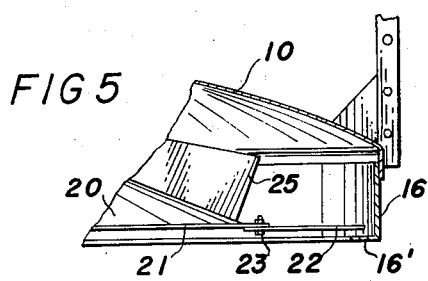
INVENTORS
JOHN T. PHILLIPS JR.
JOHN C. BOESCH JR.
THOMAS A. ELLIOTT
BY
ATTORNEY Sept. 27, 1960   J. T. PHILLIPS, JR., ET AL   2,953,888
ROTARY TYPE GREEN FORAGE HARVESTER
Filed Aug. 8, 1955   2 Sheets-Sheet 2

INVENTORS
JOHN T. PHILLIPS JR.
JOHN C. BOESCH JR.
THOMAS A. ELLIOTT
BY
ATTORNEY 2,953,888
Patented Sept. 27, 1960

2,953,888
ROTARY TYPE GREEN FORAGE HARVESTER

John T. Phillips, Jr., and John C. Boesch, Jr., Albany, and Thomas A. Elliott, Decatur, Ga., assignors to Lilliston Implement Company, Albany, Ga., a corporation of Georgia Filed Aug. 8, 1955, Ser. No. 527,082

7 Claims. (Cl. 56—25.4)

This invention relates to harvesters and is particularly concerned with harvesters for the cutting of green forage and the feeding of such forage to receptacles or transport means moving with the harvester. While certain aspects of the present inventive concept may be broadly applicable to various types of harvesters and particularly those for the harvesting of green forage, the invention is especially concerned with a rotary type harvester including conveying means for the forage after severance.

Heretofore many devices have been proposed for the cutting of crops of the kind described and some of such devices have included power means for elevating the crop for delivery into containers or trailers traveling with the harvester. In such devices where mechanical elevating and transporting means have been provided, separate motor means have usually been required and complicated multi-part structure have been necessarily involved. It has also been proposed that a fluid current, such as air, be employed to elevate the cut crop for loading or transporting. Air flow devices as have heretofore been suggested either entrain and convey the material from a point substantially remote from the cutting zone, and thus independently of the harvesting action or suction is applied directly at the cutting edge, incurring the danger of dirt and foreign matter with the severed crop. In both instances separate air impelling equipment is required and in the former the application of pressure is so remote as to preclude its utility in scavenging the blades as they move from their cutting operation to facilitate free delivery of the severed crop from the cutting zone. In the second instance, the inclusion of foreign matter sucked up with the crop may completely destroy the usefulness of the same.

It is therefore among the primary objects of the present invention to provide a novel and improved harvester means for the simultaneous severance of crops and the conveyance thereof to a suitable point of discharge.

Another object of the present invention is to provide a structure of the character described which will be simple and efficient in operation, rigid and sturdy in construction and well designed to meet the demands of economic manufacture.

A further object of the present invention is to provide in a device of the character described, means operable with and as an incident to the cutting movements by which air flow is induced for the conveyance of entrained crop material.

The invention also includes among its objects that of providing air flow control means whereby the air force may be adjusted to conform with varying conditions of operation.

It is also an object of the present invention to provide in a device of the character described for an air flow for entraining and elevating a severed crop, which flow is maintained effectively, efficiently, and substantially without inward flow at the zone of cutting, thus obviating the danger of entrainment of dirt and foreign matter.

Numerous other objects, features and advantages of the present invention will be apparent from consideration of the following specification taken in conjunction with the accompanying drawings in which:

Fig. 1 is a side elevation of one preferred embodiment of the present invention.

Fig. 2 is an enlarged vertical cross-sectional view through the apparatus shown in Fig. 1.

Fig. 5 is a fragmentary view showing a modification of a detail.

Figure 3:
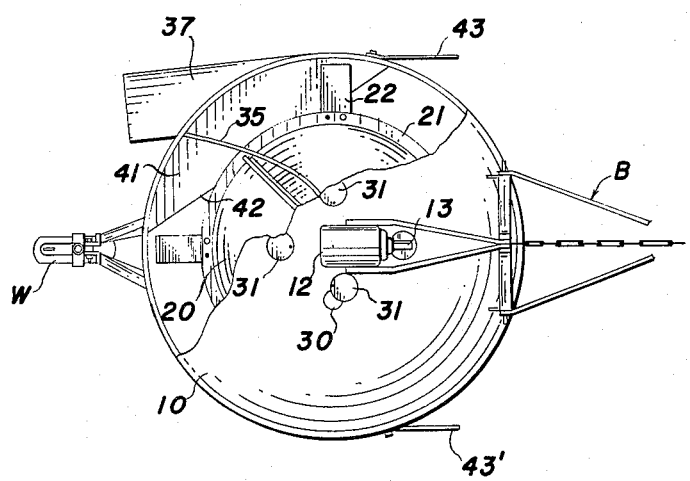
Fig. 3 is a detail top plan view of the apparatus of Figs. 1 and 2, a portion of the top thereof being broken away to disclose the internal mechanism.
Figure 4:
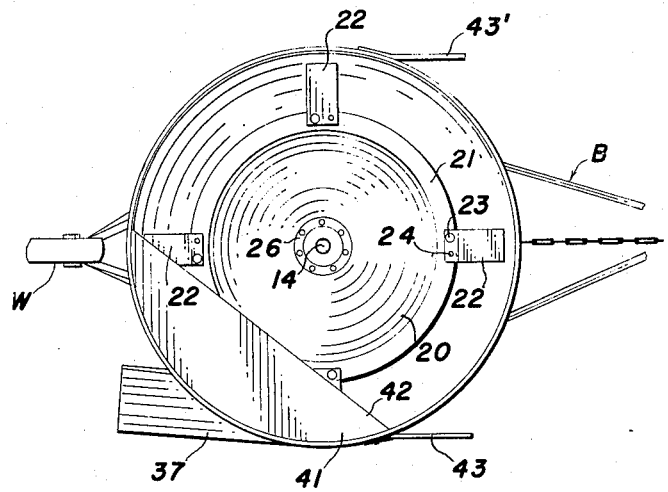
Fig. 4 is a bottom plan view illustrating the cutter mechanism and the discharge guide arrangement.

In general terms, that form of the invention herein presented by way of illustration may be briefly defined as including a rotary horizontal cutter element located within a suitable casing and in which the rotary element is provided with air impeller means for directing a stream of air in contact with the severed crop whereby the crop will be entrained in such air to be conveyed and discharged. A feature of the present invention is the provision of adjustable means for admitting the air so as to control the force and velocity thereof in relation to varying factors, such as speed of harvesting, density of crop and/or its weight and humidity. Another important feature is the imparting of peripheral circular movement to the air flow so as to effectively entrain the crop without directly subjecting the cutting zone to suction whereby foreign matter might be entrained.

Referring now more particularly to the drawings, it will be understood that the present invention may be suitably attached and vertically or tiltably adjusted with respect to a tractor, one wheel of which is indicated at T, through a conventional tractor engaging hitch generally indicated by the letter B. The present construction also provides for the connection of a drive shaft D from the tractor for imparting rotation to the cutter element of the harvester as hereinafter described. In the construction herein presented, it will be understood that the mechanism referred to by reference to the characters T, B and D is a conventional three point suspension tractor hitch and that the invention is not concerned with the structural details or functioning of such parts. Thus various tractor constructions and coupling arrangements may be employed and the present structure is amenable to securement, adjustment and manipulation by such various types of tractor coupling means. In combination with the tractor hitch a vertically adjustable caster wheel W is supported from a vertically adjustable shaft S to provide for parallelism in the travel of the device in adjusting for height of cut above ground.

The body of the present invention comprises a generally circular dome shaped casing or frame member including a hood 10 upon the central boss 11 of which there is mounted a transmission housing 12. A stub shaft 13 protruding horizontally and forwardly from the housing 12 engages the drive shaft D above referred to. From the shaft 13, drive is imparted to a vertical shaft 14 to which the combined cutter and impeller of the present invention is secured. To the depending flange 15 of the hood 10, there is secured a circular skirt 16 which encases the combined cutter and impeller and defines a circular space extending above the cutter by which the crop is retained within the confines of the device until discharge thereof by entrainment in the air stream as hereinafter described. The skirt 16 may be turned inwardly, as shown at 16' in Fig. 5, to underline the blade tips to assist in preventing outward flow of air beneath the skirt 16.

The combined cutter and impeller of the present invention comprises a substantially frusto-conical, downwardly and outwardly flowing body portion 20 having a horizontal peripheral edge 21 to which is secured a plurality of radially extending cutting blades 22, here shown as rectangular and four in number. Each blade is secured to the peripheral flange 21 by a substantially thick and resistant bolt 23 which may pass loosely through the blade. A shear pin 24 also engages between edge 21 and the blades 22 to provide spaced attachment for the blade to retain the same in its radial disposition with respect to the body 20, but providing means whereby in the case of shock or overload the shear pin 24 will release the blade so as to permit pivotal movement thereof about bolt 23 out of the way of such obstruction as may cause such shock or overload. The upper central portion of the body 20 is formed with an inwardly extending flange 26 which the body 20 is secured as by bolts 27 to a disk 28 mounted on and secured for rotation with the shaft 14.

For inducing an air flow for conveying the crop after severance by rotation of blades 22, the upper surface of the frusto conical body 20 is provided with a plurality of upstanding impeller blades 25 which rotate in the space defined between the upper surface of the body 20 and the lower face of the downwardly inclined domed shaped hook 10. As here shown, the blades are vertical and radially located, being secured by flanges bolted as at 29. Air is admitted above the impeller into the space defined between hood 10 and body 20, without inducing a suction at the point of severance of the crop, through a plurality of spaced apertures 30 the openings of which may be readily controlled by pivotally mounted dampers 31. By reference to Fig. 2, it will be noted that the air inlet apertures 30 are placed about the central portion of the hood 10, thus air as brought into motion by rotation of the impeller blades 25 will move radially outward from such central portion toward the outer edge of the device. It will also be noted that the free air flow space between the under side of the hood 10 and the upper face of the body 20 increases in a radially outward direction, thus lending itself to the relatively unrestricted flow of air as induced by the rotation of the impellers. Such air flow will thus be seen to be vertical in that it has both radial components as well as rotary components, imported by the cutter rotation. Thus, as the crop is severed, the air flow substantially limited to the area above the blades will entrain the severed material to sweep it rearwardly with the peripheral travel of the blades but without the application of suction at the point of severance where the agitation of the cutting action might cause an entrainment of dirt and foreign matter. The air pressure and rate of flow may be conveniently controlled by adjustment of the dampers 31. If desired, full opening of such dampers may provide an excess pressure at the peripheral edge of the skirt 16.

It is to be noted especially that the hood 10 is closed except for the openings 30 as controlled by the dampers 31, and the rotary body 20 is completely closed to the passage of air therethrough and is substantially smooth on its underside to minimize air disturbance.

As the air moves outwardly and peripherally entraining the severed crop, it is guided outwardly by a vertical baffle 35 extending inwardly from the skirt 16 toward the center of the hood 10. Baffle 35 is cut away at 36 to permit movement thereunder of the impeller blades 25. Discharge of severed crop material as entrained by the air flow is provided by a tangentially arranged horizontal discharge tube 37 opening through the skirt 16 from a point approximately on a transverse plane normal to the direction of travel of the harvester and extending rearwardly therefrom. The outer end of tube 37 is rectangular to receive the flexible harvest discharge connection 38 communicating with an upwardly and rearwardly inclined rigid section 39 terminating in a discharge spout 40 of conventional form. Adjacent the opening of the discharge tube 37 through the skirt 16, there is provided a lower horizontal pan 41 the front face 42 of which is arranged as a chord to the circle described by the cutting blades and substantially centrally positioned with respect to the discharge 37. This arrangement is such as to form a confining tangential outlet vertically between the upper face of the pan 41 and the lower face of the hood 10 and horizontally between the front face of the baffle 35 and the inner wall of the confronting portion of the skirt 16. Forwardly extending guide arms 43—43' may be provided to assist in the gathering in of the crop.

In the operation of the device as the harvester is caused to traverse the field through motivation of the tractor, power is supplied through the shaft 13 and the transmission member 12 to rotate the frusto-conical cutter 20 and the blades 22 thereof so that the standing crop entering the skirt 16 will be severed as the harvester is drawn over the field. As an incident to the rotation of the member 20, the impeller blades 25 will be rotated to induce a vertical flow of air from the top openings 30 into the passage between hood 10 and the number 20 defined by the inner wall of skirt 16 and the front surface of the baffle 35 and thence through the tube 37. It will of course be understood that as the cutter is rotated, the severed material will be carried by the impetus of the blade impact as well as by air entrainment toward the outlet and will be precluded from dropping from under the harvester by the horizontal pan 41. It will also be seen that the air movement will enforce upward travel of the crop through the discharge connections 38, 39, and 40 to be received by a trailer or the like not shown moving with the harvester.

In the construction and operation of the device here presented, it will be noted that the air passage is through the top of a member 10 and thence downwardly over the top of the body 20 of the cutter element and outward toward the outlet, rather than inwardly and upwardly from the skirt 16. Hence the invention provides for the severance and discharge of severed crop material without inclusion in the entrainment, elevation and conveyance thereof of dirt and foreign matter which would render the collected crop objectionable if not without utility. In further considering the structure and operation of the present invention, it will be understood that the invention is here presented by way of illustration, and in the practice thereof numerous changes, modifications and the full use of equivalents may be resorted to without departure from the spirit or scope of the invention as defined in the appended claims.

We claim:

1. A rotary type harvester including a casing, a rotary cutter rotatably mounted within said casing for severing crops traversed by said harvester and an air impeller rotatable with said cutter to produce an air flow to entrain crops severed by said cutter to convey said crops from said casing, said cutter and casing defining a chamber for the flow of air above the cutting zone of said cutter, said casing further defining air inlets arranged adjacent the central portion thereof and adjustable dampers mounted on said casing for controlling said inlets.

2. A harvester comprising a casing including a generally circular dome-shaped hood, a cutter rotatably mounted within said hood including a generally frusto-conical body radiating blades mounted on the periphery of said body and radial air impellers mounted on said body, said impellers comprising upstanding fins and a baffle within said casing for tangentially diverting air flow induced by said impellers, together with a plate partially closing the bottom of said casing adjacent said baffle.

3. A harvester comprising a casing including a generally circular dome-shaped hood, a cutter rotatably mounted within said hood including a generally frusto-conical body, radiating blades mounted on the periphery of said body, and radial air impellers mounted on said body, said impellers comprising radially arranged fins, and a baffle within said casing for tangentially diverting air flow induced by said impellers, together with a plate partially closing the bottom of said casing adjacent said baffle.

4. A rotary tractor drawn and powered harvester including a casing having a circular hood and a depending skirt, a cutter rotatably mounted centrally of said casing including a vertical drive shaft, a frusto-conical body mounted on said shaft, cutter blades extending from said body, air impelling fins on said body above said blades, and said hood defining air inlets above said fins.

5. A rotary tractor drawn and powered harvester including a casing having a circular hood and a depending skirt, a cutter rotatably mounted centrally of said casing including a vertical drive shaft, a frusto-conical body mounted on said shaft, cutter blades extending from said body, air impelling fins on said body above said fins, said hood defining air inlets above said fins, and means mounted on said hood for controlling the inlet of air through said inlets.

6. A rotary tractor drawn and powered harvester including a casing having a circular hood and a depending side skirt, a cutter rotatably mounted centrally of said casing including a vertical drive shaft, a frusto-conical body mounted on said shaft, cutter blades extending from said body and air impelling fins on said body above said blades, said hood defining air inlets above said fins, means mounted on said hood for controlling the inlet of air through said inlets, and a tangential outlet defined by said casing.

7. A rotary tractor drawn and powered harvester including a casing having a circular hood and a depending skirt, a cutter rotatably mounted centrally of said casing including a vertical drive shaft, a frusto-conical body mounted on said shaft, cutter blades extending from said body, air impelling fins on said body above said blades, said hood defining an air inlet above said fins, means mounted on said hood for controlling the inlet of air through said inlet, and a tangential outlet defined by said casing together with vertical and horizontal plates mounted on said casing and defining a discharge path for crops severed by said blades and entrained in air flow induced by said fins.

References Cited in the file of this patent

UNITED STATES PATENTS

| | | |
|---|---|---|
| D. 172,936 | Phelps | Aug. 31, 1954 |
| 1,336,257 | Muzzy | Apr. 6, 1920 |
| 1,899,564 | Frey | Feb. 28, 1933 |
| 2,522,112 | Gilmour | Sept. 12, 1950 |
| 2,539,779 | Grosso | Jan. 30, 1951 |
| 2,557,598 | Daggett | June 19, 1951 |
| 2,578,880 | Doyle | Dec. 18, 1951 |
| 2,636,333 | Michaels | Apr. 28, 1953 |
| 2,718,739 | Long | Sept. 27, 1955 |
| 2,719,396 | Morris et al. | Oct. 4, 1955 |
| 2,720,070 | Arrington | Oct. 11, 1955 |
| 2,728,182 | Fulton et al. | Dec. 27, 1955 |
| 2,737,772 | Jacobsen | Mar. 13, 1956 |
| 2,762,184 | Farrer | Sept. 11, 1956 |
| 2,791,078 | Kiekhaefer | May 7, 1957 |
| 2,793,484 | McNeill et al. | May 28, 1957 |
| 2,796,714 | Denney | June 25, 1957 |
| 2,807,126 | Bennett | Sept. 24, 1957 |
| 2,836,021 | Wood et al. | May 27, 1958 |